United States Patent
Wyse

(10) Patent No.: US 7,219,548 B2
(45) Date of Patent: May 22, 2007

(54) PICKOFF SENSOR OBTAINING OF VALUE OF PARAMETER FROM SUBSTANTIALLY ZERO NET DAMPENING TORQUE LOCATION OF PENDULOUS SENSOR COMPONENT

(75) Inventor: Stanley F. Wyse, Encino, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 439 days.

(21) Appl. No.: 10/665,168

(22) Filed: Sep. 18, 2003

(65) Prior Publication Data

US 2004/0211259 A1   Oct. 28, 2004

Related U.S. Application Data

(60) Provisional application No. 60/464,795, filed on Apr. 23, 2003.

(51) Int. Cl.
*G01C 19/00* (2006.01)
*G01P 15/13* (2006.01)

(52) U.S. Cl. .................. 73/504.04; 73/514.23

(58) Field of Classification Search ..............
73/514.21–514.24, 504.04, 504.12, 504.15,
73/504.02, 514.01, 514.02, 514.12, 514.14,
73/514.15, 514.17, 514.18, 514.29
See application file for complete search history.

(56) References Cited

U.S. PATENT DOCUMENTS

| | | | |
|---|---|---|---|
| 4,267,731 A | | 5/1981 | Jacobson |
| 5,488,865 A | * | 2/1996 | Peters ...................... 73/514.23 |
| 5,821,420 A | * | 10/1998 | Cho et al. ................. 73/504.16 |
| 5,932,803 A | * | 8/1999 | Wyse ....................... 73/504.04 |
| 6,041,653 A | * | 3/2000 | Ichikawa et al. ......... 73/514.32 |
| 6,272,925 B1 | * | 8/2001 | Watson ..................... 73/504.12 |
| 6,294,400 B1 | * | 9/2001 | Stewart et al. ................. 438/52 |
| 6,474,160 B1 | | 11/2002 | Stewart et al. |
| 6,595,056 B2 | | 7/2003 | Stewart |
| 2001/0042403 A1 | | 11/2001 | Watson |

* cited by examiner

*Primary Examiner*—Helen Kwok
(74) *Attorney, Agent, or Firm*—Carmen B. Patti & Assoc., LLC

(57) ABSTRACT

A pendulous sensor component of an apparatus in one example reacts to a parameter. One or more pickoff sensors that obtain a value of the parameter from a substantially zero net dampening torque location of the pendulous sensor component.

25 Claims, 3 Drawing Sheets

PICKOFF SENSOR OBTAINING OF VALUE OF PARAMETER FROM SUBSTANTIALLY ZERO NET DAMPENING TORQUE LOCATION OF PENDULOUS SENSOR COMPONENT

CROSS-REFERENCE TO RELATED APPLICATIONS

This application claims the priority of U.S. provisional Patent Application Ser. No. 60/464,795 (by Stanley F. Wyse, filed Apr. 23, 2003, and entitled "PICKOFF SENSOR OBTAINING OF VALUE OF PARAMETER FROM SUBSTANTIALLY ZERO NET DAMPENING TORQUE LOCATION OF PENDULOUS SENSOR COMPONENT").

This application contains subject matter that is related to the subject matter of the following application, which is assigned to the same assignee as this application. The below-listed application is hereby incorporated herein by reference in its entirety:

"HINGE POSITION LOCATION THAT CAUSES PENDULOUS AXIS TO BE SUBSTANTIALLY PARALLEL WITH DRIVE COMPONENT DIRECTION," by Robert E. Stewart, co-filed herewith.

TECHNICAL FIELD

The invention relates generally to electromechanical systems and more particularly to pressure sensitivity reduction in electromechanical systems.

BACKGROUND

An electromechanical system in one example measures a parameter. For example, the electromechanical system comprises a micro-electromechanical system ("MEMS") gyroscope that measures a rotation. The gyroscope in one example comprises a pendulous sensor component, a dither drive component, and a pickoff sensor. The dither drive component operates along a dither drive axis to set the pendulous sensor component into oscillation. The pendulous sensor component reacts to the rotation. The pickoff sensor obtains a value of the rotation from a motion of the pendulous sensor component.

One source of error in the rotation measurement is a bias sensitivity to changes in pressure. If the pressure is changing over time, then a model for bias compensation will be incorrect. In general, the Q of the gyroscope is inversely proportional to pressure for pressures below 1 mm of Hg (1 Torr). A bias may be introduced to the gyroscope by a misalignment of the dither drive that actuates the pendulous sensor component. The bias in one example increases a sensitivity to pressure of the gyroscope. As one shortcoming, the accuracy of the rotation measurement of the gyroscope decreases as pressure sensitivity increases.

Thus, a need exists for a reduction in a sensitivity to pressure of electromechanical systems.

SUMMARY

The invention in one implementation encompasses an apparatus. The apparatus comprises a pendulous sensor component that reacts to a parameter. One or more pickoff sensors obtain a value of the parameter from a substantially zero net dampening torque location of the pendulous sensor component.

In another implementation, the invention encompasses an electromechanical gyroscope. The electromechanical gyroscope comprises a pendulous sensor component that reacts to a rotation. One or more pickoff sensors obtain a value of the rotation from a substantially zero net dampening torque location of the pendulous sensor component. The location of the one or more pickoff sensors promotes a reduction in a pressure sensitivity of the pendulous sensor component.

A further implementation of the invention encompasses a method. A value of a rotation parameter is obtained from a substantially zero net dampening torque location of a pendulous sensor component. The value of the rotation parameter is employed to make a determination of one or more locations of one or more pickoff sensors.

DESCRIPTION OF THE DRAWINGS

Features of exemplary implementations of the invention will become apparent from the description, the claims, and the accompanying drawings in which:

DETAILED DESCRIPTION

Figure 1:
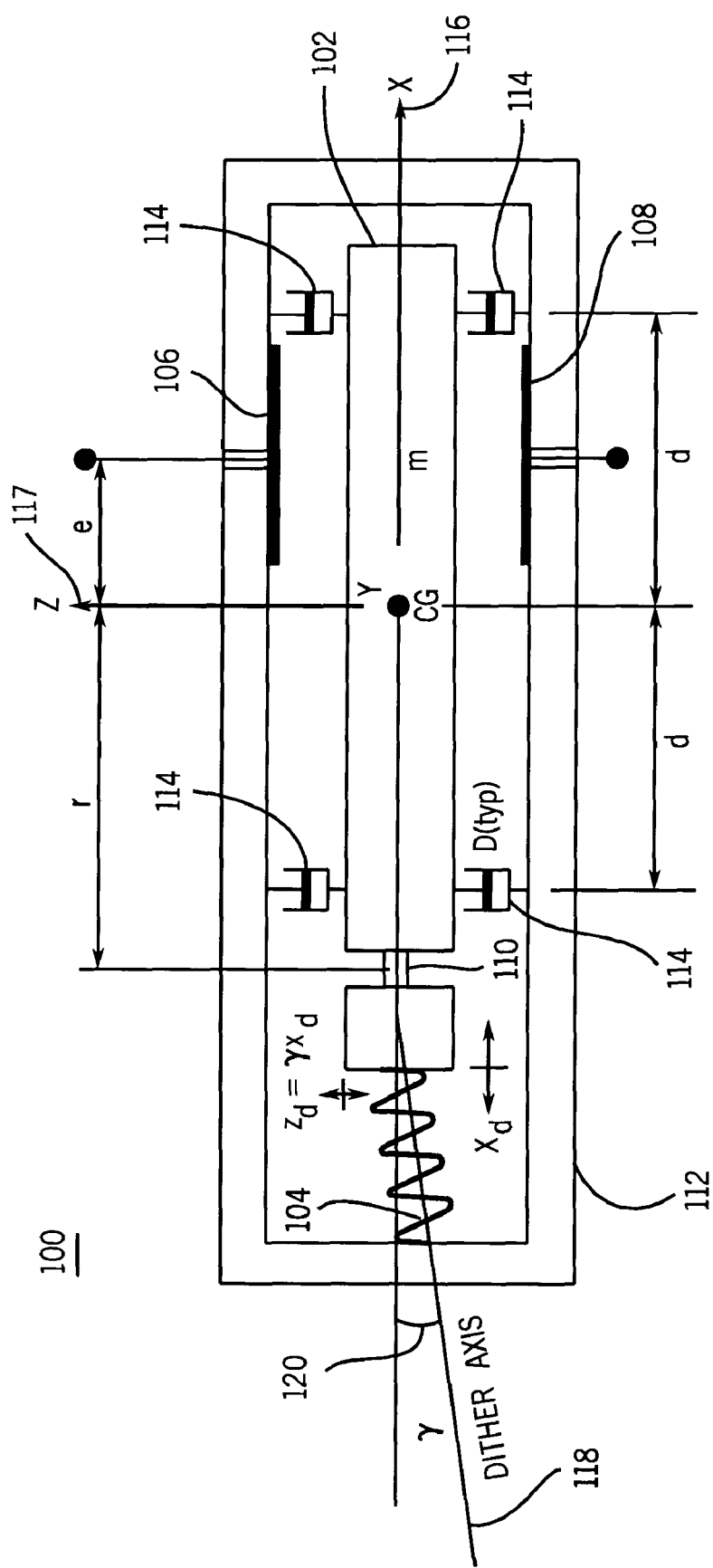
FIG. 1 is a side, sectional representation of an exemplary implementation of an apparatus that comprises one or more pendulous sensor components, one or more dither drive components, and one or more pickoff sensors.

Turning to FIG. 1, an apparatus 100 in one example comprises a plurality of components such as hardware components. A number of such components can be combined or divided in one example of the apparatus 100. The apparatus 100 in one example comprises any (e.g., horizontal, oblique, or vertical) orientation, with the description and figures herein illustrating one exemplary orientation of the apparatus 100, for explanatory purposes.

The apparatus 100 in one example comprises a micro-electromechanical system ("MEMS") gyroscope and/or accelerometer as disclosed in U.S. Pat. No. 6,474,160 to Stewart, et. al. (issued Nov. 5, 2002, entitled "Counterbalanced Silicon Tuned Multiple Accelerometer-Gyro," and assigned to Northrop Grumman Corporation), which is hereby incorporated herein by reference in its entirely. For example, the apparatus 100 comprises one or more pendulous sensor components 102, one or more dither drive components 104, and one or more pickoff sensors 106 and 108.

Figure 2:
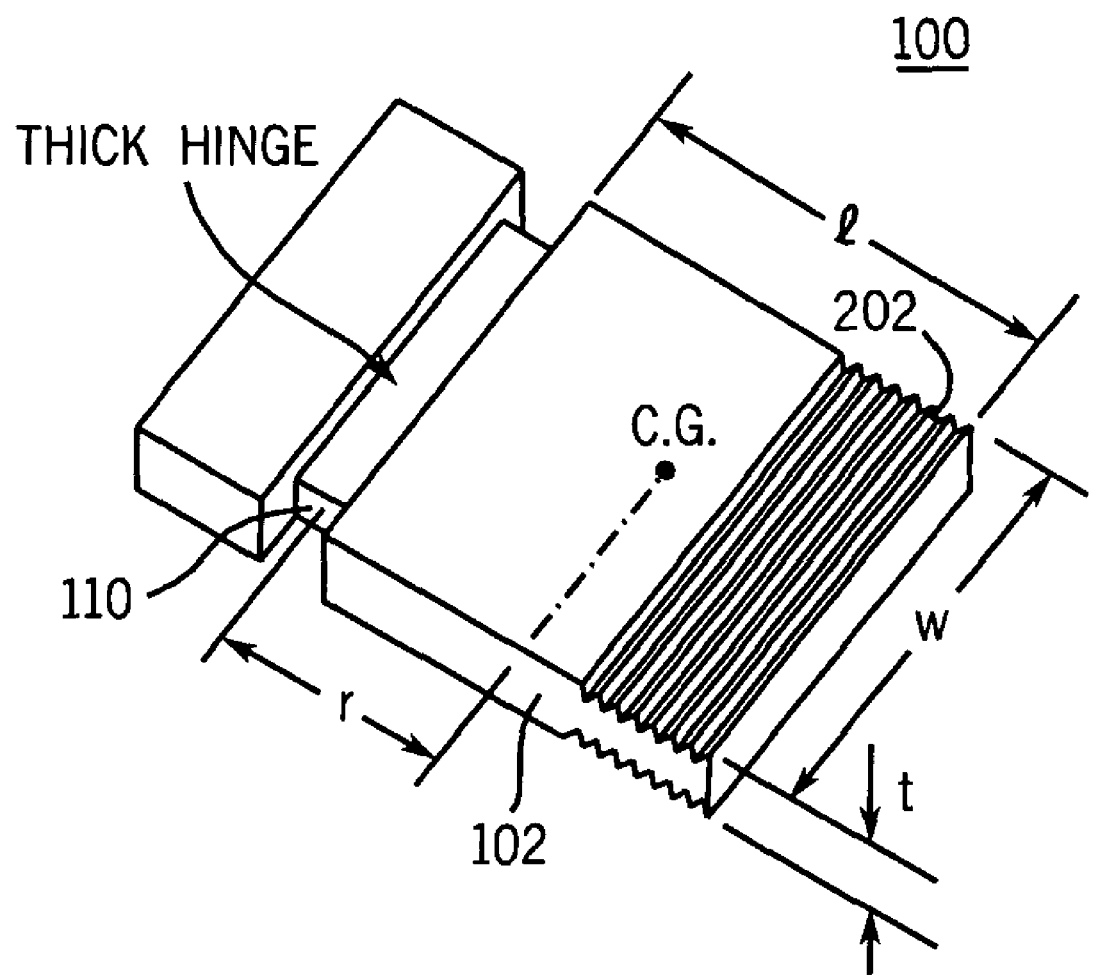
FIG. 2 is a perspective representation of an another embodiment illustrating one or more groves in the pendulous sensor component of the apparatus of FIG. 1.

In one example, the pendulous sensor component 102 comprises a rectangular plate. In another example, the pendulous sensor component 102 comprises the rectangular plate with one or more grooves 202 on the top and bottom of the rectangular plate (FIG. 2). The pendulous sensor component 102 comprises a mass (m) and a radius (r). The pendulous sensor component 102 is suspended from the dither drive component 104 by a flexure hinge 110. Upon subjection to a rotation (e.g., an angular rate), the pendulous sensor component 102 oscillates about the flexure hinge 110 in a direction perpendicular to the motion of the dither drive component 104. The pendulous sensor component 102 is dampened relative to a frame 112. The dampening is distributed across the length of the pendulous sensor component 102, but is represented by dampeners 114. The dampeners 114 comprise a dampening coefficient (D). The dampeners 114 produce a pendulum transitional damping ($D_Z=4D$) along a Z-axis 117 relative to the frame 112. Exemplary dimension d exists between the dampeners 114 and the center of gravity (CG).

The dither drive component 104 operates along a dither drive axis 118 to set the pendulous sensor component into oscillation. The dither drive component 104 oscillates by an in-plane displacement ($X_d$) along an X-axis 116 at a frequency ($\omega_d$). The dither drive axis 118 in one example is misaligned by an angle ($\gamma$) 120. The misalignment of the dither drive axis 118 introduces a bias into the gyroscope. The bias in one example increases a sensitivity to pressure of the gyroscope. The misalignment angle ($\gamma$) 120 in combination with the dampeners 114 causes damping forces to act on the pendulous sensor component 102 to generate an error. Due to the misalignment angle ($\gamma$) 120 and the dampeners 114, the dither drive component 104 oscillates by an out-of-plane displacement ($Z_d=\gamma X_d$).

A Coriolis acceleration acts on the pendulous sensor component 102 along the Z-axis 117. The Coriolis acceleration developed by a rate ($\Omega$) about a Y-axis is $2\Omega\omega_d X_d$. The torque acting on the pendulous sensor component 102 from the Coriolis acceleration will require a rebalance torque to null the pendulous sensor component 102. The required torque is $rm(2\Omega\omega_d X_d)$. Therefore, the rebalance torque required to balance the torque due to the Coriolis acceleration will be a measure of the angular rate ($\Omega$).

Another torque that may require a rebalancing is the dampening torque generated by the out-of-plane displacement ($Z_d$) from the drive motion misalignment angle ($\gamma$) 120. By solving the equations of motion for the dynamics of the pendulous sensor component 102 it can be shown that a dampening torque is generated that in one example must be rebalanced. This dampening torque will be interpreted as an input rate ($\Omega$), however there is no actual input rate. The equation derived from the analysis is:

Dampening torque=$D_Z r(r/3-e)\omega_d Z_d/(r+e)$

Therefore the rebalance torque required to balance the generated dampening torque will be interpreted as a measured rate ($\Omega_m$) according to the following equation:

Dampening Torque=Coriolis Torque $[D_Z r(r/3-e)\omega_d Z_d]/(r+e)=rm(2\Omega_m\omega_d X_d)$ Solving for $\Omega_m$ with $D_Z=4D$ and $Z_d=\gamma X_d$ yields:

$\Omega_m=[2\gamma(r/3-e)D]/m(r+e)$

Thus, a value of e=r/3 will result in a value of $\Omega_m=0$, where (e) represents a distance from the center of gravity (CG) of the pendulous sensor component 102 to locate the pickoff sensors 106 and 108 to promote a reduction in the rate error ($\Omega_m$). The exemplary value of e=r/3 is calculated for a rectangular plate version of the pendulous sensor component 102. Other exemplary values are calculated as a function of the geometry of other versions of the pendulous sensor component 102. The location of the pickoffs 106 and 108 along the length of the pendulous sensor component 102 that corresponds to e=r/3 comprises a location where a net dampening torque acting on the pendulous sensor component 102 is substantially zero at the dither frequency for the dither along the X-axis 116 (e.g., at a center of percussion and/or a center of pressure of the pendulous sensor component 102). The location of the one or more pickoff sensors 106 and 108 promotes a reduction in a pressure sensitivity of the pendulous sensor component 102 due to a reduction in the bias error. Different shaped versions of the pendulous sensor component 102 results in the location of the pickoff sensors 106 and 108 to be slightly left or right of the location on the pendulous sensor component 102 where the net dampening torque acting on the pendulous sensor component 102 is calculated to be substantially zero.

The pickoff sensors 106 and 108 determine a rotation measurement from a motion of the pendulous sensor component 102. For example, the pickoff sensors 106 and 108 comprise pickoff electrodes for capacitive pickoff. To determine a rotation measurement, the pickoff sensors 106 and 108 sense a change in gap and/or a change in capacitance between the pendulum and the frame 112. Therefore, to promote a reduction in the rate error ($\Omega_m$), the pickoff sensors 106 and 108 are at a location along the pendulous sensor component 102 that has a reduced error movement relative to other points on the pendulous sensor component 102. For example, locating the pickoff sensors 106 and 108 at the location along the pendulous sensor component 102 where the net dampening torque acting on the pendulous sensor component 102 is substantially zero. The center of the pickoff location in one example can be virtually shifted by a servo null offset to further reduce the pressure sensitivity of the pendulous sensor component 102.

The bias error may be determined by the following equation:

bias error=$[\gamma\omega_d(r/3-e)]/2Q(r+e)$

Taking the derivative of the bias error with respect to Q results in the pressure sensitivity:

change in bias error=$-$(bias error)*[(change in $Q$)/$Q$]

Therefore, the equation shows that a 1% change in Q will generate a 1% change in the bias. However, bias error will be zero if e=r/3. For example, the pickoff sensors 106 and 108 are at the location on the pendulous sensor component 102 where the net dampening torque acting on the pendulous sensor component 102 is substantially zero. Therefore, the bias error will be substantially zero. In contrast, if the pickoff sensors 106 and 108 are located at the center of gravity (e=0) of the pendulous sensor component 102, then the bias error will be substantially greater than zero. For example, assume that $\gamma=0.001$ radians, Q=1,000, $\omega_d=28,900$ rad/sec, then the bias error (e=0)=$\gamma\omega_d/6Q$=0.0048 rad/sec, or 990°/hr.

FIG. 2 illustrates another embodiment of the pendulous sensor component 102 that comprises one or more grooves 202. The one or more grooves 202 of the pendulous sensor component 102 may result in the location of the pickoff sensors 106 and 108 to be slightly left or right of the location on the pendulous sensor component 102 where the net dampening torque acting on the pendulous sensor component 102 is substantially zero solved for the rectangular plate (e.g., e=r/3).

Figure 3:
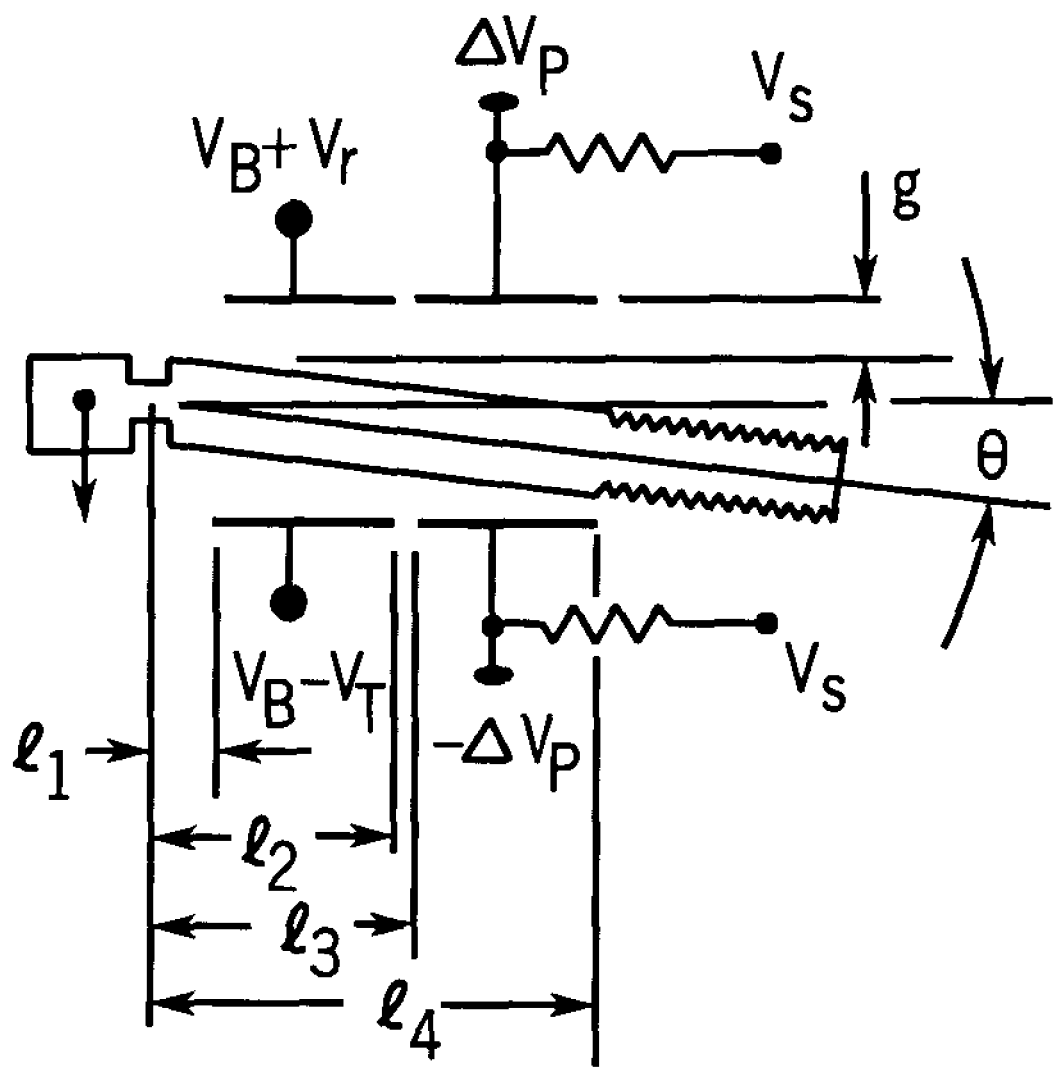
FIG. 3 is a side, sectional representation of the pendulous sensor component of the apparatus of FIG. 2.

Referring to FIGS. 2–3, the pendulous sensor component 102 comprises exemplary properties, w, t, r, C.G., $_1$, $_2$, $_3$, $_4$, $V_B$, $V_R$, $V_S$, $V_T$, $\Delta V_P$, $\theta$, and g. Exemplary values comprise =3.6 mm, w=3.2 mm, t=0.5 mm, r=1.85 mm, $_1$=0.6 mm, $_2$=1.8 mm, $_3$=1.82 mm, and $_4$=2.5 mm.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
   a pendulous sensor component that reacts to a parameter; and
   one or more pickoff sensors that sense a value of the parameter from a substantially zero net dampening torque location of the pendulous sensor component.

2. The apparatus of claim 1, wherein the parameter comprises a rotation parameter, wherein the one or more pickoff sensors obtain the value of the rotation parameter from the substantially zero net dampening torque location of the pendulous sensor component,
   one or more dampener components that control a rotation of the pendulous sensor component, wherein the rotation parameter is based on the rotation of the pendulous sensor component;
   wherein one or more of the one or more dampener components cause an application of a dampening torque to the pendulous sensor component, wherein one or more locations of one or more of the one or more pickoff sensors serve to promote a reduction of the dampening torque.

3. The apparatus of claim 1, wherein the pendulous sensor component comprises a pressure sensitivity, wherein one or more locations of one or more of the one or more pickoff sensors serve to promote a reduction of the pressure sensitivity of the pendulous sensor component.

4. The apparatus of claim 1, wherein the pendulous sensor component is coupled with a frame, wherein one or more of the one or more pickoff sensors comprise one or more pickoff electrodes that serve to sense a change in a capacitance between the pendulous sensor component and the frame.

5. The apparatus of claim 4, wherein the pendulous sensor component comprises a pressure sensitivity, wherein one or more of the one or more pickoff electrodes employ the change in the capacitance to promote a reduction in the pressure sensitivity of the pendulous sensor component.

6. The apparatus of claim 1, wherein the pendulous sensor component is coupled with a drive component through employment of a hinge, wherein the parameter comprises a torque parameter derived from a torque on the pendulous sensor component, wherein the pendulous sensor component employs the torque parameter to accomplish one or more oscillations of the pendulous sensor component about the hinge.

7. The apparatus of claim 6, wherein one or more of the one or more pickoff sensors sense the value of the torque parameter to promote a reduction of the torque parameter on the pendulous sensor component.

8. The apparatus of claim 6, wherein the drive component comprises a dither drive component, wherein the hinge component comprises a flexure hinge component, wherein the dither drive component applies an acceleration on the pendulous sensor component to obtain the torque parameter.

9. The apparatus of claim 8, wherein the one or more of the one or more pickoff sensors serve to promote a reduction of the acceleration on the pendulous sensor component.

10. The apparatus of claim 8, wherein the pendulous sensor component comprises a pressure sensitivity, wherein the one or more locations of the one or more of the one or more pickoff sensors serve to promote a reduction in the pressure sensitivity of the pendulous sensor component.

11. The apparatus of claim 1, wherein the pendulous sensor component comprises one or more grooves, wherein one or more of the one or more grooves determine a location of one or more of the one or more pickoff sensors.

12. An electromechanical gyroscope, comprising:
    a pendulous sensor component that reacts to a parameter;
    one or more pickoff sensors that obtain a value of a rotation from a substantially zero net dampening torque location of the pendulous sensor component; and
    wherein a location of the one or more pickoff sensors promotes a reduction in a pressure sensitivity of the pendulous sensor component.

13. A method, comprising the steps of:
    obtaining a value of a rotation parameter from a substantially zero net dampening torque location of a pendulous sensor component; and
    employing the value of the rotation parameter to make a determination of one or more locations of one or more pickoff sensors.

14. The method of claim 13, wherein the pendulous sensor component is coupled with one or more dampeners, wherein the rotation parameter comprises a dampening torque, wherein the step of employing the value of the rotation parameter to make the determination of the one or more locations of the one or more pickoff sensors comprises the steps of:
    measuring the value of the dampening torque of one or more of the one or more dampeners;
    employing the value of the dampening torque to make the determination of the one or more locations of the one or more pickoff sensors; and
    employing the determination of the one or more locations of the one or more pickoff sensors to promote a reduction of the dampening torque.

15. The method of claim 13, wherein the pendulous sensor component comprises a pressure sensitivity, wherein the pendulous sensor component is coupled with a frame, wherein one or more of the one or more pickoff sensors comprise one or more pickoff electrodes, the method further comprising the steps of:
    sensing a change in a capacitance between the pendulous sensor component and the frame; and
    employing the change in the capacitance to promote a reduction in the pressure sensitivity of the pendulous sensor component.

16. The method of claim 13, wherein the pendulous sensor component is coupled to a drive component through employment of a hinge, wherein the rotation parameter comprises a torque parameter derived from a torque on the pendulous sensor component, wherein the step of obtaining the value of the torque parameter from the substantially zero net dampening torque location of the pendulous sensor component comprises the steps of:
    employing the torque parameter provided by the drive component to accomplish one or more oscillations of the pendulous sensor component about the hinge;
    measuring the value of the torque parameter at the pendulous sensor component;
    sensing the value of the torque parameter from the substantially zero net dampening torque location of the pendulous sensor component.

17. The method of claim 16, wherein the pendulous sensor component comprises a pressure sensitivity, wherein the drive component generates an acceleration to derive the torque parameter on the pendulous sensor component, wherein the step of sensing the value of the torque parameter from the substantially zero net dampening torque location of the pendulous sensor component comprises the steps of:

employing the determination of the one or more locations of the one or more pickoff sensors to promote a reduction of the acceleration on the pendulous sensor component from the substantially zero net dampening torque location of the pendulous sensor component; and employing the determination of the one or more locations of the one or more pickoff sensors to promote a reduction in the pressure sensitivity of the pendulous sensor component.

18. The method of claim 13, wherein the pendulous sensor component comprises one or more grooves, wherein the step of employing the value of the rotation parameter to determine the one or more locations of the one or more pickoff sensors comprises the steps of:

determining one or more locations of one or more of the one or more grooves; and employing one or more of the one or more locations of the one or more of the one or more grooves and the value of the rotation parameter to determine one or more of the one or more locations of the one or more pickoff sensors.

19. The apparatus of claim 1, further comprising a dither drive component that induces a relative oscillation between the pendulous sensor component and a frame.

20. The apparatus of claim 19, herein the relative oscillation between the pendulous sensor component and the frame induces dampening forces on the pendulous sensor component.

21. The apparatus of claim 20, wherein the parameter comprises an angular rate of the pendulous sensor component, wherein upon occurrence of the angular rate, a Coriolis force acts on the pendulous sensor component, wherein the dampening forces are in phase with the Coriolis force;

wherein the one or more pickoff sensors sense the value of the angular rate from the substantially zero net dampening torque location of the pendulous sensor component to promote a reduction of the effect of the dampening forces on a measurement of the Coriolis force.

22. The apparatus of claim 1, wherein one or more first dampening forces act on the pendulous sensor component, wherein one or more second dampening forces act on the pendulous sensor component;

wherein at the substantially zero net dampening torque location, the one or more first dampening forces cancel the effects of the one or more second dampening forces.

23. The method of claim 13, wherein a dither drive component induces a relative oscillation between the pendulous sensor component and a frame, wherein the relative oscillation between the pendulous sensor component and the frame induces dampening forces on the pendulous sensor component;

wherein the rotation parameter comprises an angular rate of the pendulous sensor component, wherein upon occurrence of the angular rate, a Coriolis force acts on the pendulous sensor component, wherein the dampening forces are in phase with the Coriolis force;

the method further comprising the step of:

locating the one or more pickoff sensors on the frame at the substantially zero net dampening torque location of the pendulous sensor component promote a reduction of effect of the dampening forces on a measurement of the Coriolis force.

24. The apparatus of claim 1, wherein the substantially zero net dampening torque location of the pendulous sensor component is based on geometry of the pendulous sensor component.

25. The apparatus of claim 1, wherein the substantially zero net dampening torque location comprises a center of percussion and/or a center of pressure of the pendulous sensor component.

* * * * *